(12) United States Patent
Kimura et al.

(10) Patent No.: US 7,583,131 B2
(45) Date of Patent: Sep. 1, 2009

(54) CHARGE PUMP CIRCUIT

(75) Inventors: Taiki Kimura, Gunma (JP); Kensuke Goto, Tochigi (JP)

(73) Assignees: Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 0 days.

(21) Appl. No.: 12/038,579

(22) Filed: Feb. 27, 2008

(65) Prior Publication Data

US 2008/0218250 A1 Sep. 11, 2008

(30) Foreign Application Priority Data

Feb. 28, 2007 (JP) .............................. 2007-049112

(51) Int. Cl.
*G05F 1/10* (2006.01)
(52) U.S. Cl. ....................................... 327/534; 327/536
(58) Field of Classification Search ................ 327/534, 327/535, 536, 564, 565, 566
See application file for complete search history.

(56) References Cited

U.S. PATENT DOCUMENTS

| 7,030,681 B2* | 4/2006 | Yamazaki et al. ........... 327/534 |
| 7,177,167 B2* | 2/2007 | Kawagoshi ................. 363/60 |
| 7,355,437 B2* | 4/2008 | Perisetty ..................... 326/14 |

FOREIGN PATENT DOCUMENTS

| JP | 2001-231249 | 8/2001 |
| JP | 2001-286125 | 10/2001 |

* cited by examiner

*Primary Examiner*—Jeffrey S Zweizig
(74) *Attorney, Agent, or Firm*—Morrison & Foerster LLP (57) ABSTRACT

In a charge pump circuit provided with a positive electric potential generating charge pump circuit that generates a positive electric potential and a negative electric potential generating charge pump circuit that generates a negative electric potential, a parasitic bipolar transistor is prevented from turning on so that the charge pump circuit performs normal voltage boosting operation. First, the negative electric potential generating charge pump circuit is put into operation to generate −VDD as an output electric potential LV. Since the output electric potential LV is applied to a P-type semiconductor substrate, an electric potential of the P-type semiconductor substrate becomes −VDD. After that, the positive electric potential generating charge pump circuit is put into operation while the negative electric potential generating charge pump circuit continues its operation. The positive electric potential generating charge pump circuit performs the normal operation, because the electric potential of the P-type semiconductor substrate is −VDD. After the output electric potential HV of the positive electric potential generating charge pump circuit reaches 2VDD, the negative electric potential generating charge pump circuit is put into a second operation mode (inverting HV).

3 Claims, 11 Drawing Sheets

FIG.5 t2 : NEGATIVE ELECTRIC POTENTIAL GENERATING
CHARGE PUMP CIRCUIT IS PUT INTO OPERATION t1 : POSITIVE ELECTRIC POTENTIAL GENERATING
CHARGE PUMP CIRCUIT IS PUT INTO OPERATION

FIG.9 t4 : POSITIVE ELECTRIC POTENTIAL GENERATING
CHARGE PUMP CIRCUIT IS PUT INTO OPERATION t3 : NEGATIVE ELECTRIC POTENTIAL GENERATING
CHARGE PUMP CIRCUIT IS PUT INTO OPERATION

PRIOR ART

CHARGE PUMP CIRCUIT

CROSS-REFERENCE OF THE INVENTION

This application claims priority from Japanese Patent Application No. 2007-049112, the content of which is incorporated herein by reference in its entirety.

BACKGROUND OF THE INVENTION

1. Field of the Invention

This invention relates to a charge pump circuit, specifically to a charge pump circuit provided with a negative electric potential generating charge pump circuit that generates a negative electric potential and a positive electric potential generating charge pump circuit that generates a positive electric potential.

2. Description of the Related Art

In general, a charge pump circuit is composed of multi-stages of pumping packets formed by connecting charge transfer MOS transistors in series so as to boost an input electric potential, and is widely used in circuits such as a power supply circuit for a drive circuit of a display device.

Some LSIs (large-scale integrated circuits) such as a drive circuit and the like require a positive electric potential relative to a ground electric potential VSS and a negative electric potential relative to the ground electric potential VSS. In this case, a negative electric potential generating charge pump circuit that generates the negative electric potential and a positive electric potential generating charge pump circuit that generates the positive electric potential are formed on a single P-type semiconductor substrate to form a charge pump circuit.

The negative electric potential generated by the negative electric potential generating charge pump circuit is applied to the P-type semiconductor substrate. The positive electric potential generating charge pump circuit is formed in an N-type well that is formed in a surface of the P-type semiconductor substrate. The positive electric potential is applied to the N-type well.

In the charge pump circuit described above, the positive electric potential generating charge pump circuit and the negative electric potential generating charge pump circuit have been controlled to start operation simultaneously or controlled so that the positive electric potential generating charge pump circuit starts operation first and then the negative electric potential generating charge pump circuit starts operation using the positive electric potential.

Detailed descriptions on the charge pump circuit are found in Japanese Patent Application Publication Nos. 2001-231249 and 2001-286125, for example.

Figure 14:
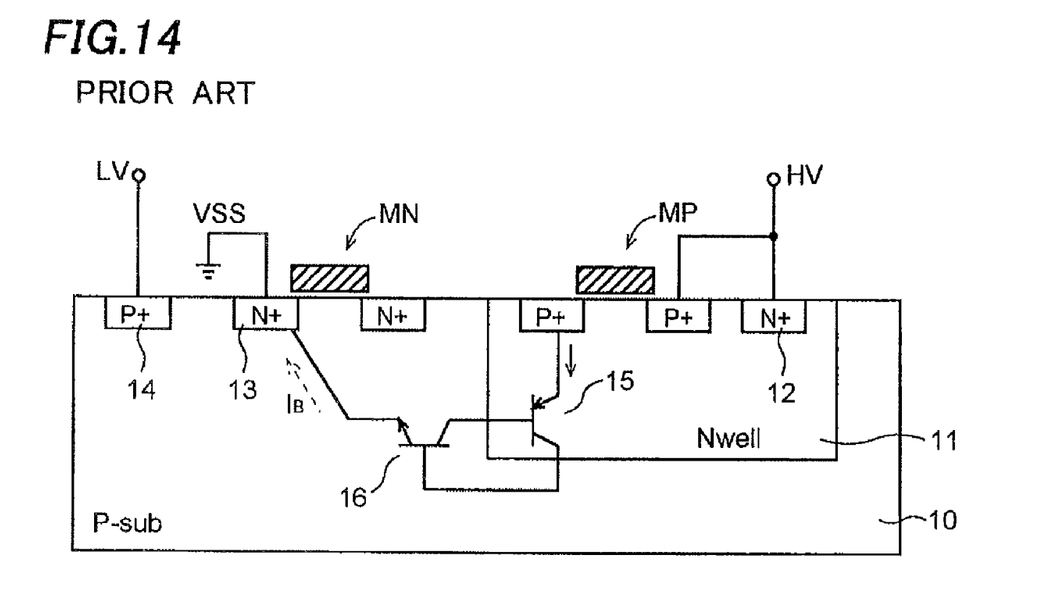
FIG. 14 is a partial cross-sectional view of a conventional charge pump circuit.

However, the charge pump circuit described above has a problem of abnormal voltage boosting. The problem and its cause will be described referring to FIG. 14. An N-type well 11 is formed in a surface of a P-type semiconductor substrate 10. A charge transfer MOS transistor MP in the positive electric potential generating charge pump circuit is formed in the N-type well 11. Although there is a plurality of charge transfer MOS transistors in the charge pump circuit, FIG. 14 shows only the charge transfer MOS transistor MP in a final stage, which outputs an output electric potential HV of the positive electric potential generating charge pump circuit. The positive output electric potential HV of the positive electric potential generating charge pump circuit is applied to the N-type well 11 through an N$^+$-type diffusion layer 12 formed in a surface of the N-type well 11.

An N-channel type MOS transistor MN is formed in the surface of the P-type semiconductor substrate 10 adjacent the N-type well 11. The N-channel type MOS transistor MN makes a clock driver that provides the negative electric potential generating charge pump circuit with a clock, for example, and its source, which is an N$^+$-type diffusion layer 13, is provided with the ground electric potential VSS.

A P$^+$-type diffusion layer 14 is formed in the surface of the P-type semiconductor substrate 10 adjacent the N-channel type MOS transistor MN. A negative output electric potential LV (a negative electric potential relative to the ground electric potential VSS) of the negative electric potential generating charge pump circuit is applied to the P-type semiconductor substrate 10 through the P$^+$-type diffusion layer 14. The P-type semiconductor substrate 10 is biased around the ground electric potential VSS through the N$^+$-type diffusion layer 13 when the negative electric potential generating charge pump circuit is not in operation.

When the positive electric potential generating charge pump circuit is put into operation, however, a substrate current flows into the P-type semiconductor substrate 10 by turning-on of a parasitic bipolar transistor 15, and an electric potential of the P-type semiconductor substrate 10 is raised to a more positive electric potential than the ground electric potential VSS. As a result, a forward current flows from the P-type semiconductor substrate 10 through a parasitic diode (P-N junction) made of the P-type semiconductor substrate 10 and the N$^+$-type diffusion layer 13. The forward current makes a base current $I_B$ of a parasitic bipolar transistor 16, and the parasitic bipolar transistor 16 is turned on. This state is interpreted as that a thyristor composed of the parasitic transistors 15 and 16 is turned on.

Here, a drain diffusion layer of the charge transfer MOS transistor MP makes an emitter, the N-type well 11 makes a base and the P-type semiconductor substrate 10 makes a collector of the parasitic bipolar transistor 15. The N$^+$-type diffusion layer 13 makes an emitter, the P-type semiconductor substrate 10 makes a base and the N-type well 11 makes a collector of the parasitic bipolar transistor 16.

When the thyristor is turned on, the positive electric potential generated by the positive electric potential generating charge pump circuit is reduced and the normal voltage boosting operation is not performed, because a stable current flows from an output end (output electric potential HV) of the positive electric potential generating charge pump circuit to the ground electric potential VSS through the P-type semiconductor substrate 10. Since the electric potential of the P-type semiconductor substrate 10 is raised, the output electric potential of the negative electric potential generating charge pump circuit is not reduced to a lower electric potential than the ground electric potential VSS and held in that state. Therefore, the negative electric potential generating charge pump circuit is also prevented from performing the normal voltage boosting operation.

SUMMARY OF THE INVENTION

This invention offers a charge pump circuit having a positive electric potential generating charge pump circuit that generates a positive electric potential, a negative electric potential generating charge pump circuit that generates a negative electric potential, a semiconductor substrate of a first conductivity type to which the negative electric potential generated by the negative electric potential generating charge pump circuit is applied, a control circuit that controls operation of the positive electric potential generating charge pump circuit and the negative electric potential generating charge pump circuit, a well of a second conductivity type formed in a surface of the semiconductor substrate and provided with the positive electric potential generated by the positive electric potential generating charge pump circuit, a diffusion layer of the second conductivity type formed in the surface of the semiconductor substrate and a clamp diode that clamps an electric potential of the semiconductor substrate to prevent a forward current from flowing from the semiconductor substrate to the diffusion layer when the positive electric potential generating charge pump circuit is in operation.

With the structure described above, turning-on of a parasitic bipolar transistor can be prevented since the electric potential of the semiconductor substrate is clamped by the clamp diode when the positive electric potential generating charge pump circuit is in operation.

This invention also offers a charge pump circuit having a positive electric potential generating charge pump circuit that generates a positive electric potential, a negative electric potential generating charge pump circuit that generates a negative electric potential, a semiconductor substrate of a first conductivity type to which the negative electric potential generated by the negative electric potential generating charge pump circuit is applied, a control circuit that controls operation of the positive electric potential generating charge pump circuit and the negative electric potential generating charge pump circuit, a well of a second conductivity type formed in a surface of the semiconductor substrate and provided with the positive electric potential generated by the positive electric potential generating charge pump circuit, and a diffusion layer of the second conductivity type formed in the surface of the semiconductor substrate, wherein the control circuit firstly puts the negative electric potential generating charge pump circuit into operation to generate the negative electric potential and then puts the positive electric potential generating charge pump circuit into operation to generate the positive electric potential.

With the structure described above, a parasitic bipolar transistor can be prevented from turning-on, since the negative electric potential generating charge pump circuit is firstly put into operation to generate the negative electric potential that biases the semiconductor substrate at the negative electric potential by the time the positive electric potential generating charge pump circuit is put into operation.

DETAILED DESCRIPTION OF THE INVENTION

Figure 1:
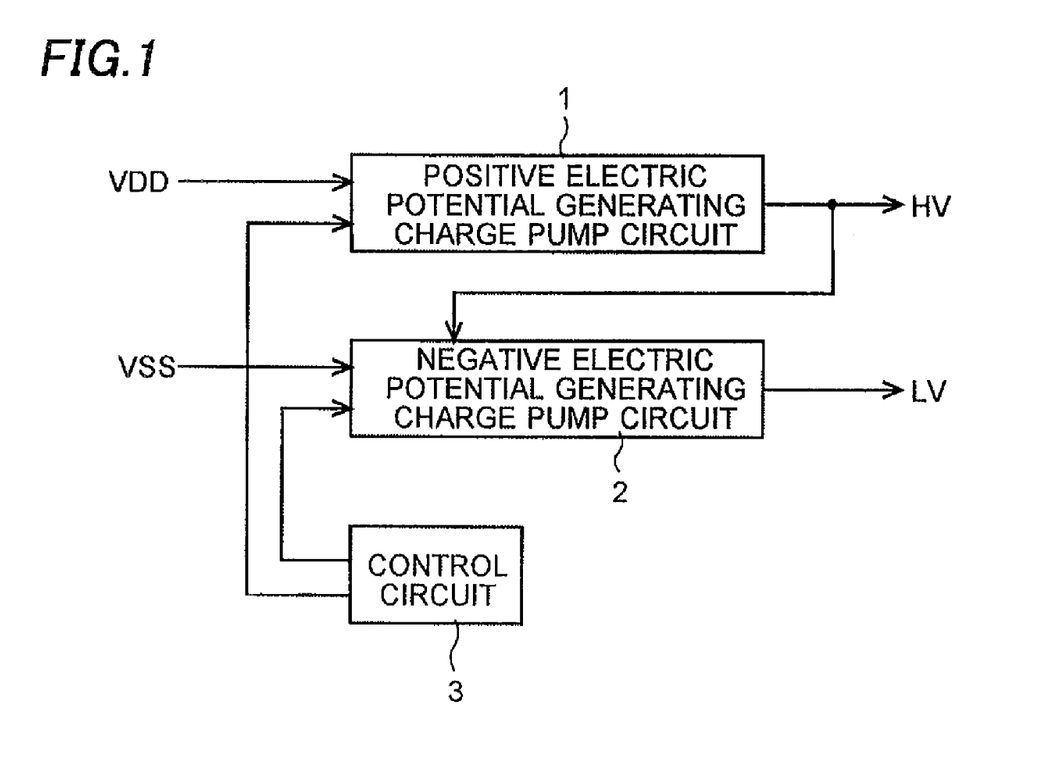
FIG. 1 is a block diagram of a charge pump circuit according to a first embodiment of this invention.

A charge pump circuit according to a first embodiment of this invention is described hereafter. FIG. 1 is a block diagram of the charge pump circuit. The charge pump circuit is formed on a P-type semiconductor substrate and is provided with a positive electric potential generating charge pump circuit 1 that generates a positive output electric potential HV, a negative electric potential generating charge pump circuit 2 that generates a negative output electric potential LV and a control circuit 3 that controls operation of the positive electric potential generating charge pump circuit 1 and the negative electric potential generating charge pump circuit 2. The negative electric potential LV generated by the negative electric potential generating charge pump circuit 2 is applied to the P-type semiconductor substrate.

Figure 2:
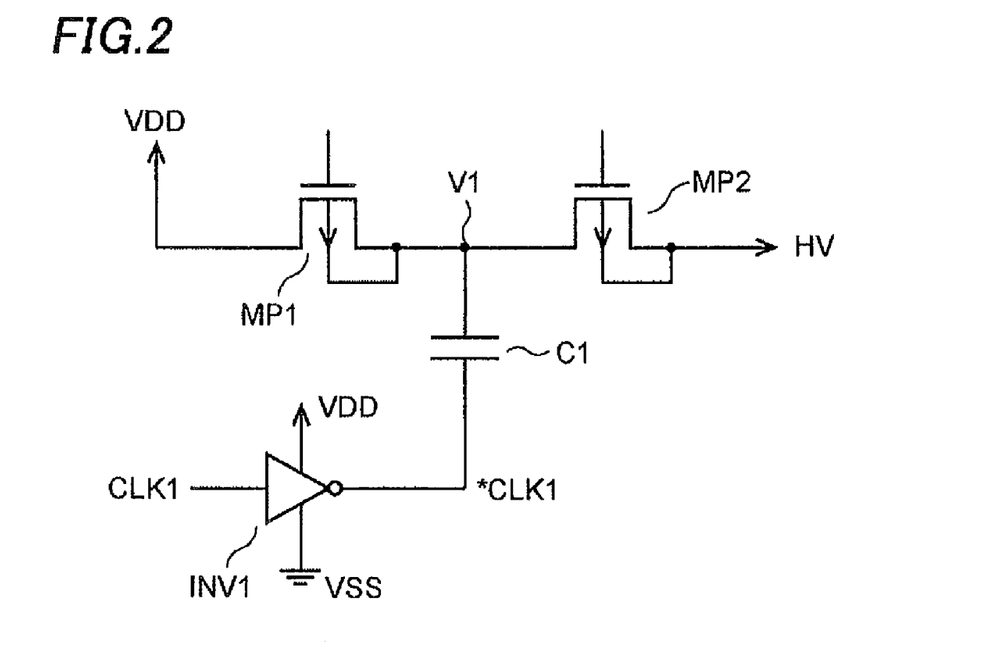
FIG. 2 is a circuit diagram of a positive electric potential generating charge pump circuit.

FIG. 2 is a circuit diagram of the positive electric potential generating charge pump circuit 1. P-channel type charge transfer MOS transistors MP1 and MP2 are connected in series. A positive power supply electric potential VDD is applied to a source of the P-channel type charge transfer MOS transistor MP1 as an input electric potential. A first terminal of a capacitor C1 is connected with a connecting node between the P-channel type charge transfer MOS transistors MP1 and MP2. A clock CLK1 is inputted to a CMOS inverter INV1 that serves as a clock driver. The CMOS inverter INV1 inverts the clock CLK1 to generate an inverted clock *CLK1 that is applied to a second terminal of the capacitor C1. Each of the P-channel type charge transfer MOS transistors MP1 and MP2 is formed in each of N-type wells which are formed in a surface of the P-type semiconductor substrate and isolated from each other.

A low level of the clock CLK1 is a ground electric potential VSS and its high level is VDD. Since a power supply electric potential of the CMOS inverter INV1 is VDD, a high level of the clock *CLK is VDD while its low level is VSS. The control circuit 3 controls supply of the clock CLK1 and switching of the P-channel type charge transfer MOS transistors MP1 and MP2. When the positive electric potential generating charge pump circuit 1 is in a stable state of operation, the positive output electric potential HV of 2VDD is obtained from a drain of MP2.

Figure 3:
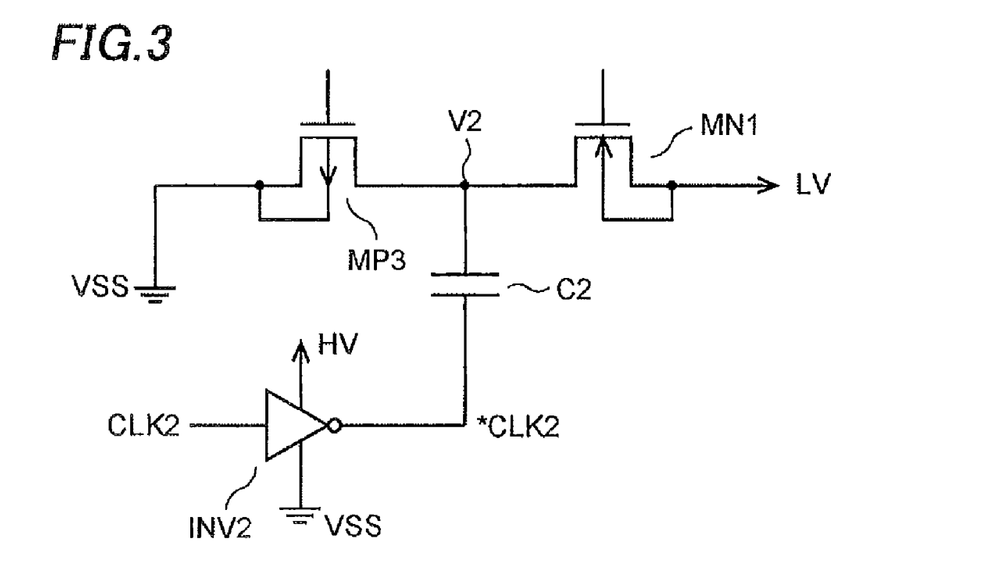
FIG. 3 is a circuit diagram of a negative electric potential generating charge pump circuit.

FIG. 3 is a circuit diagram of the negative electric potential generating charge pump circuit 2. A P-channel type charge transfer MOS transistors MP3 and an N-channel type charge transfer MOS transistor MN1 are connected in series. The ground electric potential VSS is applied to a source of the P-channel type charge transfer MOS transistor MP3 as an input electric potential.

The P-channel type charge transfer MOS transistors MP3 is formed in an N-type well formed in the surface of the P-type semiconductor substrate. MP3 is assigned to be of P-channel type because the negative output electric potential LV generated by the negative electric potential generating charge pump circuit 2 is applied to the P-type semiconductor substrate. A first terminal of a capacitor C2 is connected with a connecting node between the P-channel type charge transfer MOS transistor MP3 and the N-channel type charge transfer MOS transistor MN1.

A clock CLK2 is inputted to a CMOS inverter INV2 that serves as a clock driver. The CMOS inverter INV2 inverts the clock CLK2 to generate an inverted clock *CLK2 that is applied to a second terminal of the capacitor C2. As the clock CLK2 is generated using the output electric potential HV generated by the positive electric potential generating charge pump circuit 1, its high level is HV while its low level is VSS. Since a power supply electric potential of the CMOS inverter INV2 is HV, a high level of the clock *CLK2 is HV while its low level is VSS. The control circuit 3 controls supply of the clock CLK and switching of the P-channel type charge transfer MOS transistor MP3 and the N-channel type charge transfer MOS transistor MN1. When the negative electric potential generating charge pump circuit 2 is in a stable state of operation, the negative output electric potential LV of −2VDD is obtained from a drain of MN1.

Figure 4:
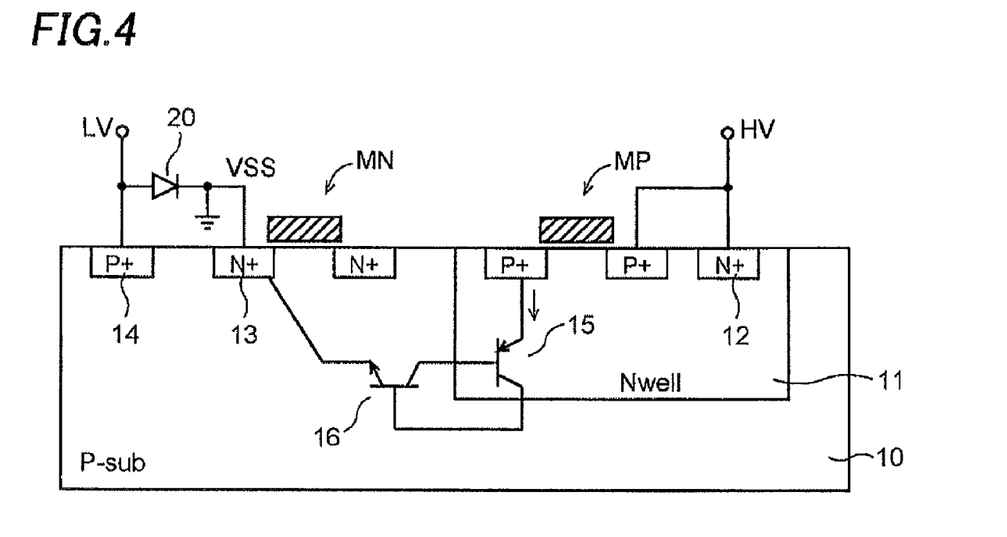
FIG. 4 is a partial cross-sectional view showing the charge pump circuit according to the first embodiment of this invention.

FIG. 4 is a partial cross-sectional view showing the charge pump circuit formed on the semiconductor substrate. The same components as those shown in FIG. 14 are denoted by the same symbols. The positive electric potential generating charge pump circuit 1, the negative electric potential generating charge pump circuit 2 and the control circuit 3 are formed on the P-type semiconductor substrate 10. A P-channel type MOS transistor MP shown in FIG. 4 corresponds to the P-channel type charge transfer MOS transistor MP2, while an N-channel type MOS transistor MN shown in FIG. 4 corresponds to an N-channel type MOS transistor forming either of the CMOS inverters INV1 and INV2, for example.

In the charge pump circuit according to this embodiment, a clamp diode 20 is connected between a P$^+$-type diffusion layer 14 formed in the surface of the P-type semiconductor substrate 10 and the ground electric potential VSS. An anode of the diode 20 is connected with the P$^+$-type diffusion layer 14 and the ground electric potential VSS is applied to its cathode. In order to clamp the semiconductor substrate 10 at as low electric potential as possible, it is preferable that a threshold voltage VF1 of the clamp diode 20 is lower than a threshold voltage VF2 of a diode that is formed of the P-type semiconductor substrate 10 and an N$^+$-type diffusion layer 13. The threshold voltage VF1 of the clamp diode 20 means a voltage between the anode and the cathode, at which a forward current of 1 μA, for example, flows, when a positive electric potential is applied to the anode of the clamp diode 20 while the cathode is grounded. It is noted that conductivity types such as P$^+$, P and P$^-$ belong to a general conductivity type and conductivity types such as N$^+$, N and N$^-$ belong to another general conductivity type.

A Schottky barrier diode has the threshold voltage VF1 of 0.3-0.4 V, and is suitable to be used as the clamp diode 20. On the other hand, a forward threshold voltage VF2 of the diode formed of the P-type semiconductor substrate 10 and the N$^+$-type diffusion layer 13 is about 0.7 V.

With this, a rise in the electric potential of the P-type semiconductor substrate 10 is suppressed even when the positive electric potential generating charge pump circuit 1 is put into operation and the substrate current flows through the P-type semiconductor substrate 10. As a result, the parasitic bipolar transistor 16 can be prevented from turning on, since the forward current does not flow through the parasitic diode formed of the P-type semiconductor substrate 10 and the N$^+$-type diffusion layer 13.

Figure 5:
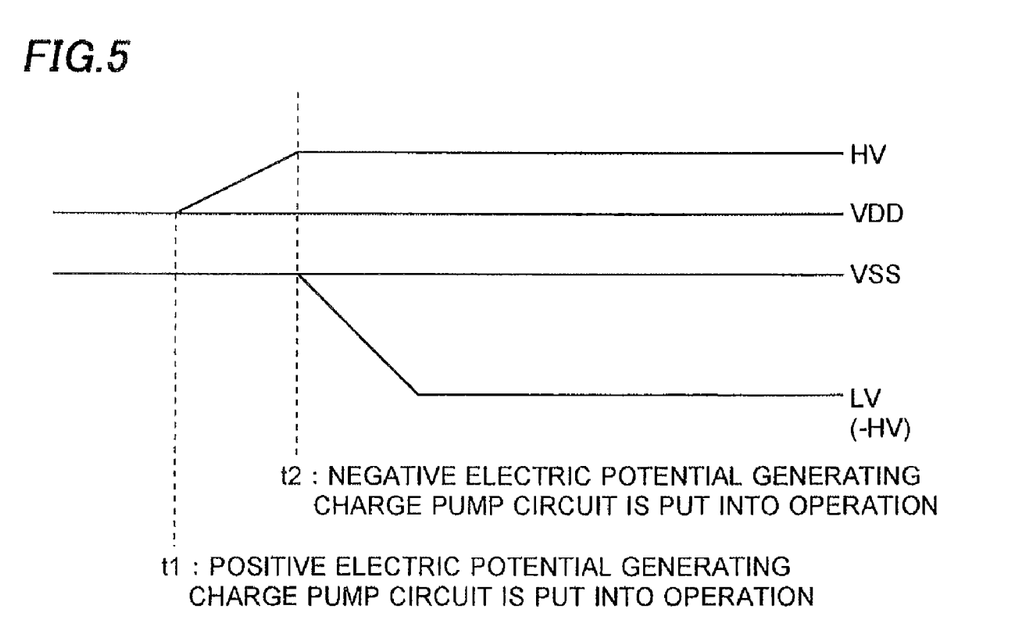
FIG. 5 is an operational timing chart of the charge pump circuit according to the first embodiment of this invention.

Therefore, the normal voltage boosting operation can be performed even when the positive electric potential generating charge pump circuit 1 is put into operation ahead of the negative electric potential generating charge pump circuit 2, as shown in FIG. 5.

Next, operations of the positive electric potential generating charge pump circuit 1 and the negative electric potential generating charge pump circuit 2 will be described concretely. First, the operation of the positive electric potential generating charge pump circuit 1 is described referring to FIG. 5 and FIG. 6. The positive electric potential generating charge pump circuit 1 is put into operation when the control circuit 3 starts providing the clock CLK1 and switching MP1 and MP2 at time t1, as shown in FIG. 5. The operation of the positive electric potential generating charge pump circuit 1 in the stable state is described referring to FIG. 6.

Figure 6:
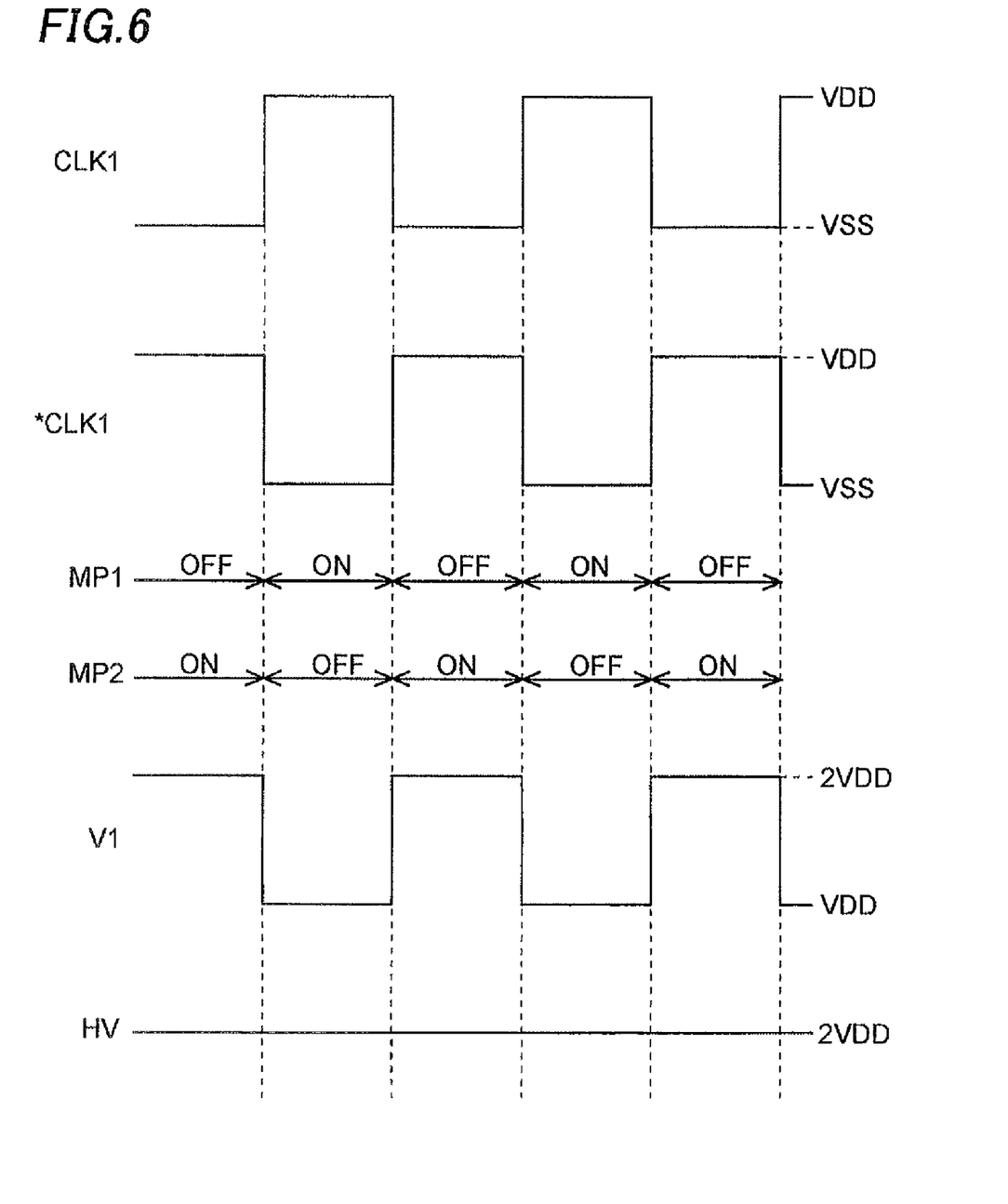
FIG. 6 is a waveform chart showing an operation of the positive electric potential generating charge pump circuit in a stable state.

When the clock *CLK1 is at the low level, MP1 is turned on, MP2 is turned off, and the electric potential V1 at the connecting node between MP1 and MP2 becomes VDD as the capacitor C1 is charged. When the clock *CLK1 is at the high level, MP1 is turned off, MP2 is turned on, and the electric potential V1 at the connecting node between MP1 and MP2 varies from VDD to 2VDD by capacitive coupling through the capacitor C1. The electric potential of 2VDD is outputted through MP2. The output electric potential HV of 2VDD is obtained by repeating the operation described above.

After that, the negative electric potential generating charge pump circuit 2 is put into operation when the control circuit 3 starts providing the clock CLK2 and switching MP3 and MN1 at time t2. Since the clock CLK2 is generated using the output electric potential HV of 2VDD generated by the positive electric potential generating charge pump circuit 1, its high level is HV and its low level is VSS, as described above. Also, since the power supply electric potential of the CMOS inverter INV2 is HV, the high level of the clock *CLK2 is HV and its low level is VSS.

Figure 7:
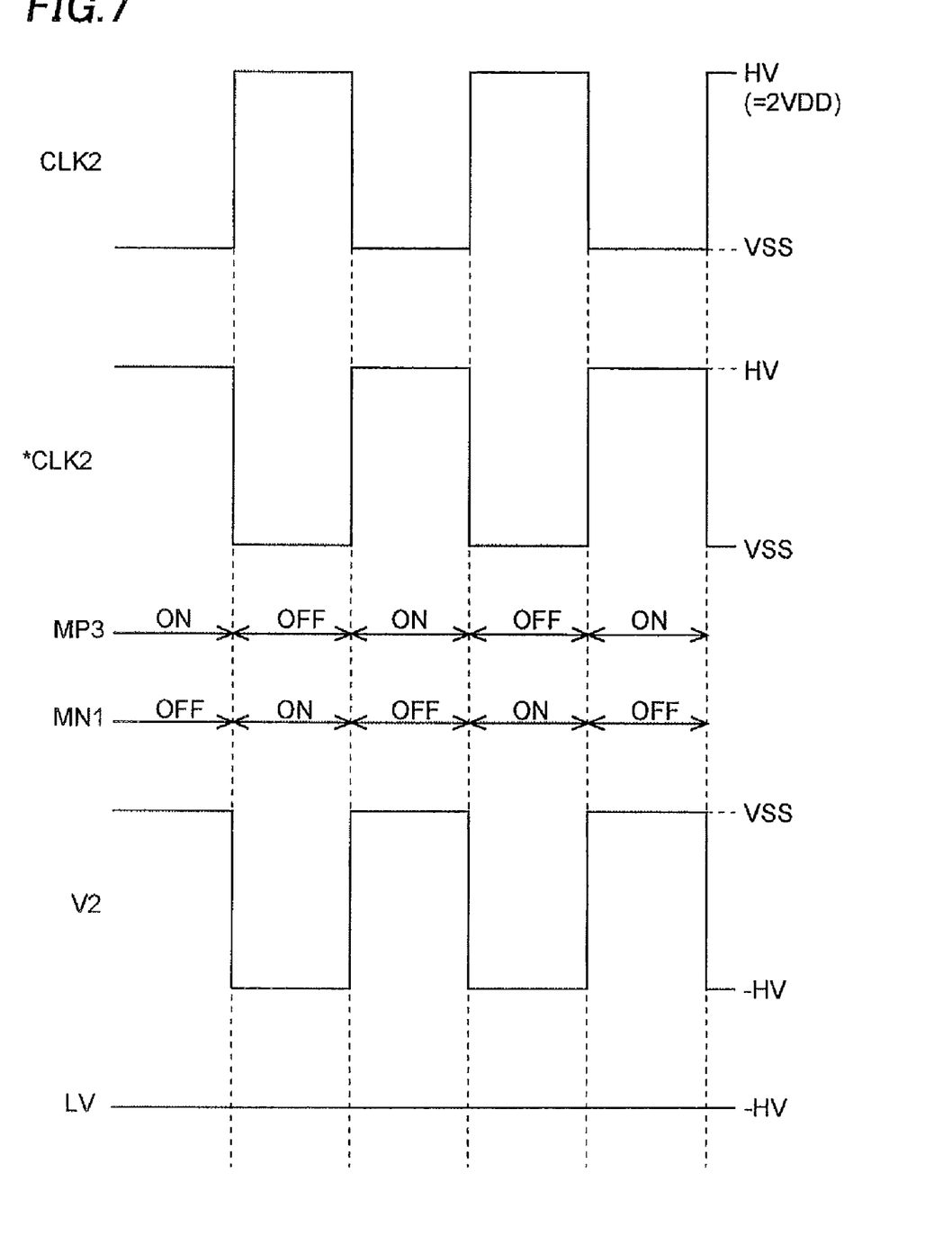
FIG. 7 is a waveform chart showing an operation of the negative electric potential generating charge pump circuit in a stable state.

The operation of the negative electric potential generating charge pump circuit 2 in the stable state is described referring to FIG. 7.

When the clock *CLK2 is at the high level, MP3 is turned on, MN1 is turned off, and the electric potential V2 at the connecting node between MP3 and MN1 becomes VSS as the capacitor C2 is charged. When the clock *CLK2 is at the low level, MP3 is turned off, MN1 is turned on, and the electric potential V2 at the connecting node between MP3 and MN1 varies from VSS to −HV (=−2VDD) by capacitive coupling through the capacitor C2. The electric potential of −HV is outputted through MN1. The output electric potential LV of −HV (=−2VDD) is obtained by repeating the operation described above.

A charge pump circuit according to a second embodiment of this invention is described hereafter. While the parasitic bipolar transistor 16 is prevented from turning on by providing the clamp diode 20 to clamp the electric potential of the P-type semiconductor substrate 10 around the ground electric potential VSS in the charge pump circuit according to the first embodiment, the parasitic bipolar transistor 16 is prevented from turning on by putting the negative electric potential generating charge pump circuit 2 into operation ahead of the positive electric potential generating charge pump circuit 1 in the charge pump circuit according to the second embodiment. This makes the clamp diode 20 unnecessary and reduces the cost.

Figure 8:
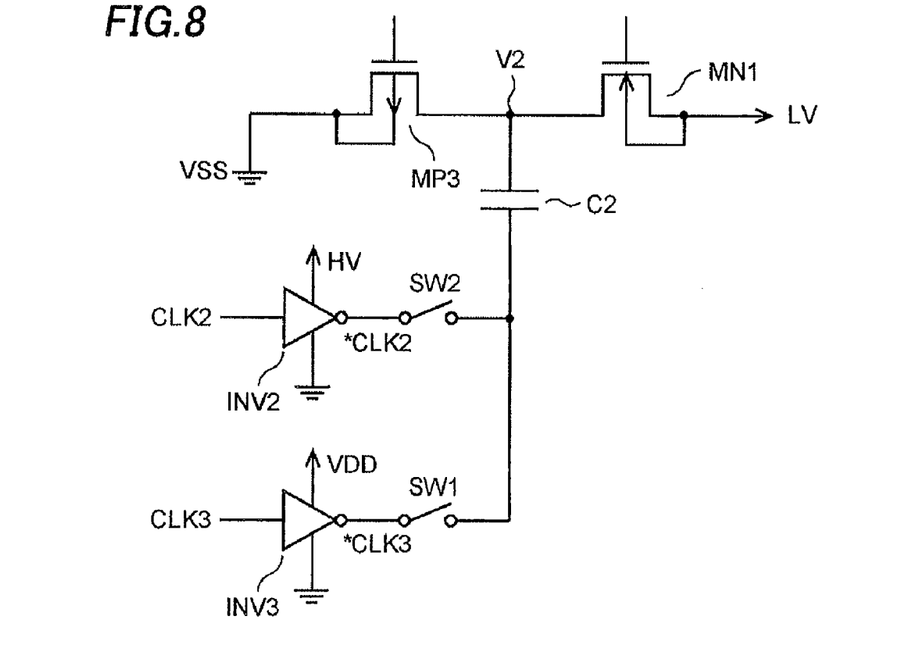
FIG. 8 is a circuit diagram of a negative electric potential generating charge pump circuit in a charge pump circuit according to a second embodiment of this invention.

The charge pump circuit according to the second embodiment is hereafter described in detail, referring to the drawings. A structure of the positive electric potential generating charge pump circuit 1 is the same as that of the circuit in the first embodiment shown in FIG. 2. The negative electric potential generating charge pump circuit 2 differs from that in the first embodiment in a structure of the clock driver, as shown in FIG. 8. That is, a CMOS inverter INV3 to which a clock CLK3 is inputted is provided in addition to the CMOS inverter INV2. The power supply electric potential of VDD is supplied to the CMOS inverter INV3. An output of the CMOS inverter INV3 is *CLK3 that is an inversion of the clock CLK3.

While the high level is HV (the output electric potential of the positive electric potential generating charge pump circuit 1) and the low level is VSS for the clocks CLK2 and *CLK2, the high level is VDD and the low level is VSS for the clocks CLK3 and *CLK3. A switch SW1 is provided to an output terminal of the CMOS inverter INV3 and a switch SW2 is provided to an output terminal of the CMOS inverter INV2 so that either of the outputs of the CMOS inverters INV2 and INV3 is selectively applied to the second terminal of the capacitor C2. Turning on/off of the switches SW1 and SW2 is controlled by the control circuit 3 shown in FIG. 1.

Figure 9:
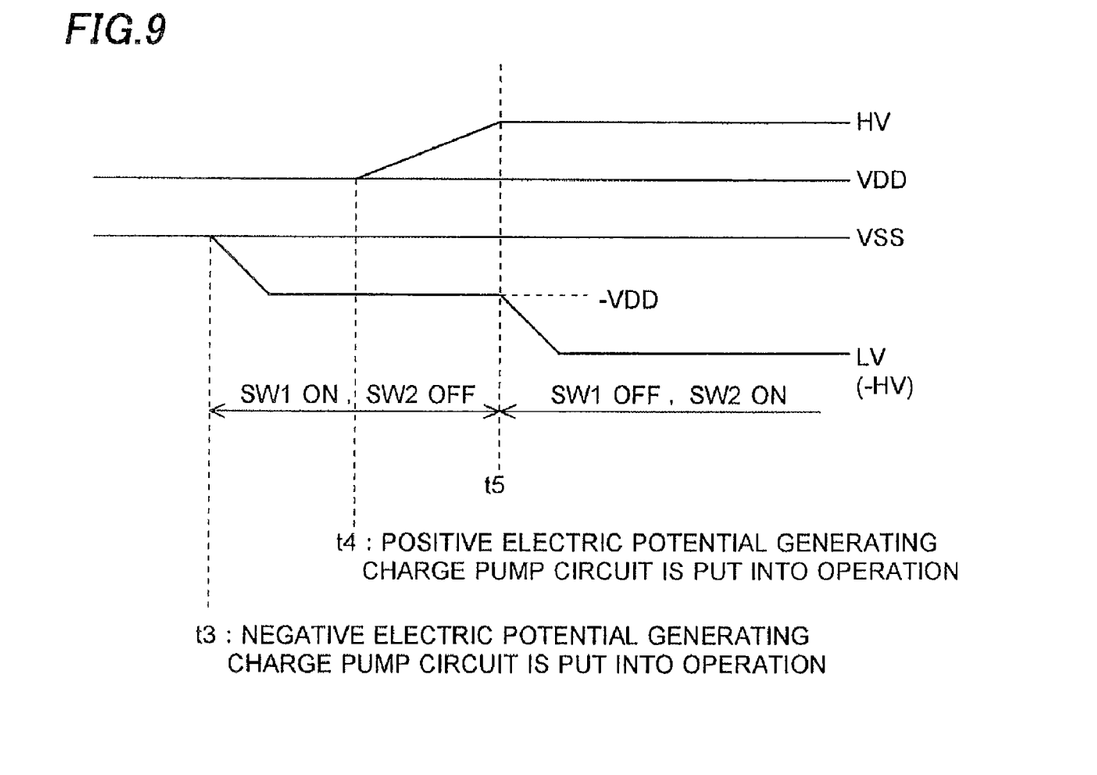
FIG. 9 is an operational timing chart of the charge pump circuit according to the second embodiment of this invention.

Next, an operation of the charge pump circuit will be described. The negative electric potential generating charge pump circuit 2 is put into operation when the control circuit 3 starts providing the clock CLK3 and switching MP3 and MN1 at time t3, as shown in FIG. 9. At that time, the switch SW1 is set to be turned on, the switch SW2 is set to be turned off, and the clock CLK3 is applied through the inverter INV3 to the second terminal of the capacitor C2. The operation of the negative electric potential generating charge pump circuit 2 in the stable state in this setting will be described referring to FIG. 10.

Figure 10:
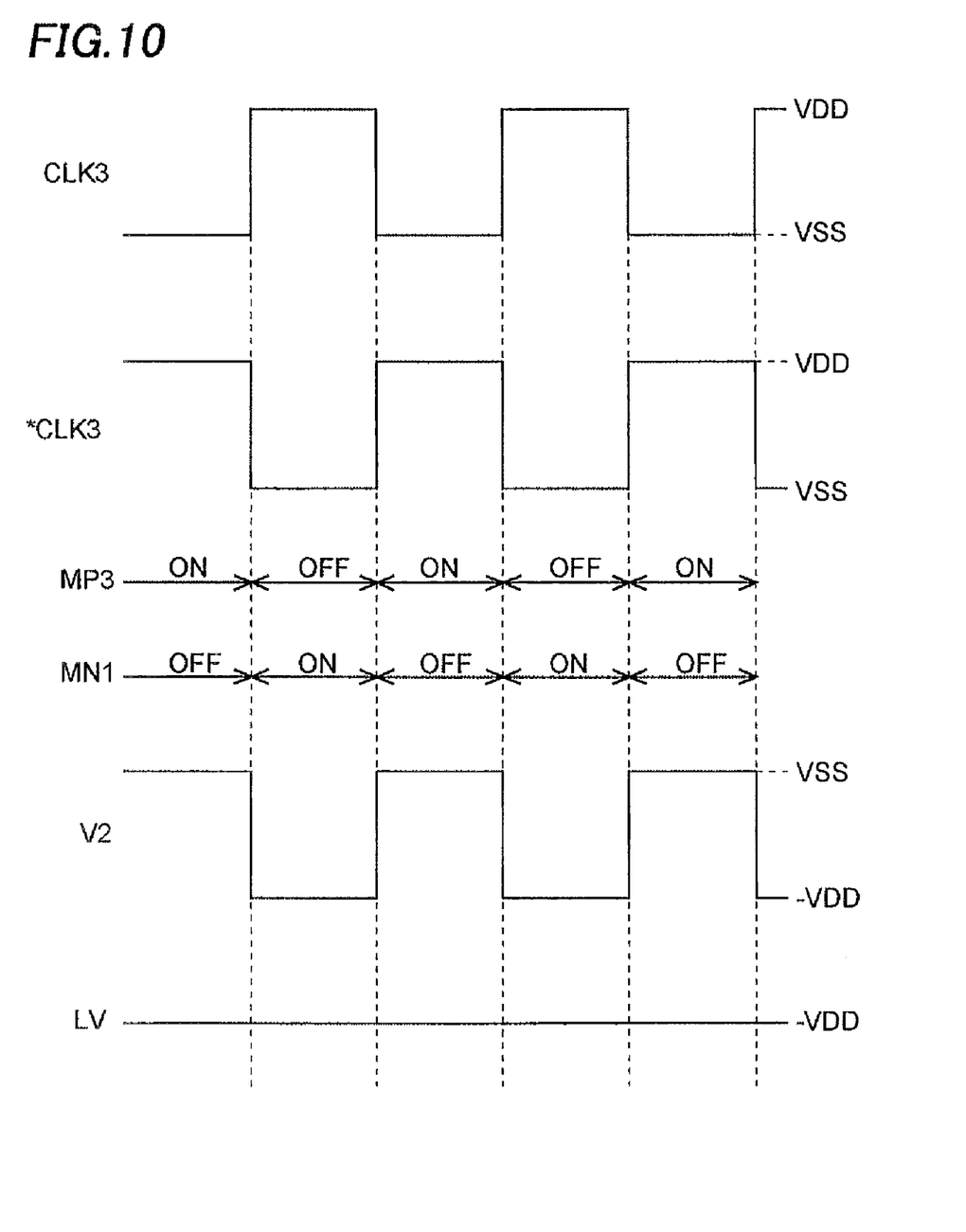
FIG. 10 is a waveform chart showing an operation in a stable state of the negative electric potential generating charge pump circuit according to the second embodiment of this invention.

When the clock *CLK3 is at the high level (VDD), MP3 is turned on, MN1 is turned off, and the electric potential V2 at the connecting node between MP3 and MN1 becomes VSS as the capacitor C2 is charged. When the clock *CLK3 is at the low level (VSS), MP3 is turned off, MN1 is turned on, and the electric potential V2 at the connecting node between MP3 and MN1 varies from VSS to −VDD by capacitive coupling through the capacitor C2. The electric potential of −VDD is outputted through MN1. The output electric potential LV of −VDD is obtained by repeating the operation described above. Since the output electric potential LV is applied to the P-type semiconductor substrate 10 through the P+-type diffusion layer 14 (Refer to FIG. 4), the P-type semiconductor substrate 10 is biased at −VDD.

After that, the positive electric potential generating charge pump circuit 1 is put into operation when the control circuit 3 starts providing the clock CLK1 and switching MP1 and MP2 at time t4. Although the substrate current flows by the operation of the positive electric potential generating charge pump circuit 1, the parasitic bipolar transistor 16 is prevented from turning on because the P-type semiconductor substrate 10 is biased to −VDD that is lower than VSS by the negative electric potential generating charge pump circuit 2. As a result, the positive electric potential generating charge pump circuit 1 operates normally, and 2VDD is outputted as its output electric potential HV (Refer to FIG. 6).

The switch SW1 is turned off and the switch SW2 is turned on at time t5 after the output electric potential HV of the positive electric potential generating charge pump circuit 1 reaches 2VDD. With this, the clock CLK2 is applied through the inverter INV2 to the second terminal of the capacitor C2. As the clock CLK2 is generated using the output electric potential HV generated by the positive electric potential generating charge pump circuit 1, its high level is HV while its low level is VSS. Also, since a power supply electric potential of the CMOS inverter INV2 is HV, a high level of the clock *CLK2 is HV while its low level is VSS.

Since the negative electric potential generating charge pump circuit 2 operates based on the clock CLK2 that has larger amplitude than CLK3, its output electric potential LV is boosted to even greater negative high voltage to obtain the negative output electric potential LV of −HV (=−2VDD). Thus, the electric potential of the P-type semiconductor substrate 10 eventually reaches −HV.

In a charge pump circuit according to a third embodiment of this invention, the parasitic bipolar transistor is prevented from turning on by putting the negative electric potential generating charge pump circuit 2 into operation ahead of the positive electric potential charge pump circuit 1, as in the charge pump circuit according to the second embodiment. What is different from the charge pump circuit according to the second embodiment is that the negative electric potential generating charge pump circuit 2 generates the negative output electric potential LV of −HV (=−2VDD) by inverting the positive output electric potential HV (=2VDD) generated by the positive electric potential generating charge pump circuit 1.

Figure 11:
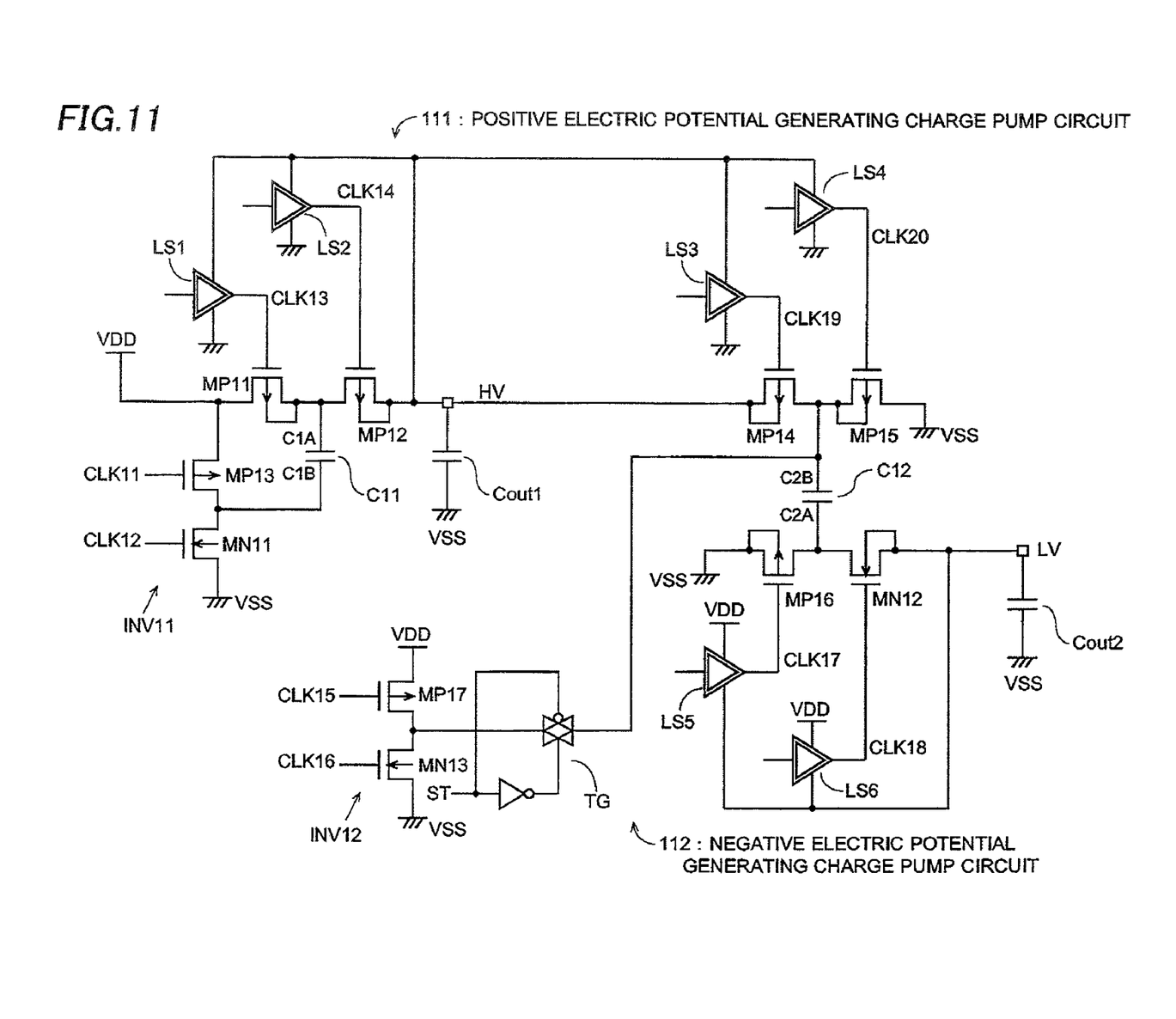
FIG. 11 is a circuit diagram of a charge pump circuit according to a third embodiment of this invention.

The charge pump circuit according to the third embodiment is hereafter described in detail. FIG. 11 is a circuit diagram of the charge pump circuit. A positive electric potential generating charge pump circuit 111 is basically the same as the positive electric potential generating charge pump circuit 1 in the charge pump circuit according to the second embodiment. P-channel type charge transfer MOS transistors MP11 and MP12 are connected in series. The positive power supply electric potential VDD is applied to a source of the P-channel type charge transfer MOS transistor MP11 as an input electric potential. When the positive electric potential generating charge pump circuit 1 is in a stable state of operation, the positive output electric potential HV of 2VDD is obtained from a drain of MP12.

A first terminal C1A of a capacitor C11 is connected with a connecting node between MP11 and MP12. A CMOS inverter INV1 is provided as a clock driver. Its output is connected with a second terminal C1B of the capacitor C11.

The CMOS inverter INV11 is composed of a P-channel type MOS transistor MP13 and an N-channel type MOS transistor MN11 connected in series between the power supply electric potential VDD and the ground electric potential VSS. A clock CLK11 is applied to a gate of MP13 while a clock CLK12 is applied to a gate of MN11. The clock CLK11 and the clock CLK12 are the same clock having a high level of VDD and a low level of VSS.

A clock CLK13 from a level shifter LS1 is applied to a gate of MP11, while a clock CLK14 from a level shifter LS2 is applied to a gate of MP12. The clock CLK13 and the clock CLK14 are opposite in phase to each other, thus MP11 and MP12 are switched complementarily to each other. A high level of the clocks CLK13 and CLK14 is HV (=2VDD) and their low level is VSS.

In a first state in which the clocks CLK11 and CLK12 are at the high level, the positive electric potential generating charge pump circuit 111 operates so that MP13 is turned off, MN11 is turned on, MP11 is turned on and MP12 is turned off, thus an electric potential at the second terminal C1B of the capacitor C11 is VSS and an electric potential at the first terminal C1A of the capacitor C11 is VDD.

In a second state in which the clocks CLK11 and CLK12 are at the low level, MP13 is turned on, MN11 is turned off, MP11 is turned off and MP12 is turned on, thus the electric potential at the second terminal C1B of the capacitor C11 is VDD and the electric potential at the first terminal C1A of the capacitor C11 is 2VDD. Electric charges at the first terminal C1A flow through MP12 into an output capacitor Cout1 to charge it. The output electric potential HV becomes 2VDD by alternating the first state and the second state.

Next, a structure of the negative electric potential generating charge pump circuit 112 will be described. P-channel type charge transfer MOS transistors MP14 and MP15 are connected in series, and the drain of MP12 in the positive electric potential generating charge pump circuit 111 is connected to a source of MP14, making the output electric potential HV of the positive electric potential generating charge pump circuit 111 be applied to the source of MP14. A drain of MP15 is grounded.

A P-channel type charge transfer MOS transistor MP16 and an N-channel type charge transfer MOS transistor MN12 are connected in series between the ground electric potential VSS and an output terminal. A capacitor C12 is connected between a connecting node between MP14 and MP15 and a connecting node between MP16 and MN12. That is, a first terminal C2A of the capacitor C12 is connected with the connecting node between MP16 and MN12, while a second terminal C2B of the capacitor C12 is connected with the connecting node between MP14 and MP15.

A clock CLK19 from a level shifter LS3 is applied to a gate of MP14, while a clock CLK20 from a level shifter LS4 is applied to a gate of MP15. The clock CLK19 and the clock CLK20 are opposite in phase to each other, thus MP14 and MP15 are switched complementarily to each other. A high level of the clocks CLK19 and CLK20 is HV (=2VDD) and their low level is VSS.

A clock CLK17 from a level shifter LS5 is applied to a gate of MP16, while a clock CLK18 from a level shifter LS6 is applied to a gate of MN12. The clock CLK17 and the clock CLK18 are the same clock, thus MP16 and MN12 switch complementarily to each other.

In addition, a CMOS inverter INV12 is provided. Its output is connected to the second terminal C2B of the capacitor C12 through a transfer gate TG that is controlled by a control signal ST. The CMOS inverter INV12 is composed of a P-channel type MOS transistor MP17 and an N-channel type MOS transistor MN13 connected in series between VDD and VSS. A clock CLK15 is applied to a gate of MP17, while a clock CLK16 is applied to a gate of MN13. The clock CLK15 and the clock CLK16 are the same clock having a high level of VDD and a low level of VSS.

The negative electric potential generating charge pump circuit 112 has two operation modes. In a first operation mode, MP14 and MP15 are kept from switching and the transfer gate TG is turned on by setting the control signal ST at a high level. The output electric potential LV of −VDD is generated by switching MP16, MP17, MN12 and MN13. This operation is the same as the operation of the negative electric potential generating charge pump circuit 2 in the first and second embodiments.

That is, in a first state in which the clocks CLK15 and CLK16 are at the low level, MP17 is turned on, MN13 is turned off, MP16 is turned on and MN12 is turned off, thus an electric potential at the second terminal C2B of the capacitor C12 is VDD and an electric potential at the first terminal C2A of the capacitor C12, which is an electric potential of the connecting node between MP16 and MN12, is VSS.

In a second state in which the clocks CLK15 and CLK16 are at the high level, MP17 is turned off, MN13 is turned on, MP16 is turned off and MN12 is turned on, thus the electric potential at the second terminal C2B of the capacitor C12 is VSS and the electric potential at the first terminal C2A of the capacitor C12 is −VDD. Electric charges at the first terminal C2A flow through MN12 into an output capacitor Cout2 to charge it. The output electric potential LV becomes −VDD by alternating the first state and the second state.

In a second operation mode, on the other hand, −HV is generated by inverting the positive output electric potential HV (=2VDD) generated by the positive electric potential generating charge pump circuit 111. MP17 and MN13 are kept from switching and the transfer gate TG is turned off by setting the control signal ST at a low level. In the first state, MP16 is turned on, MN12 is turned off, MP14 is turned on and MP15 is turned off, thus the electric potential at the second terminal C2B of the capacitor C12 is HV and the electric potential at the first terminal C2A is VSS. In the second state, MP16 is turned off, MN12 is turned on, MP14 is turned off and MP15 is turned on, thus the electric potential at the second terminal C2B is VSS and the electric potential at the first terminal C2A is −HV. The output electric potential LV becomes −HV by alternating the first state and the second state.

In the positive electric potential generating charge pump circuit 111 and the negative electric potential generating charge pump circuit 112, the N-channel type MOS transistors MN11, MN12 and MN13 are formed on the P-type semiconductor substrate 10. Each of the P-channel type MOS transistors MP11, MP12, MP13, MP14, MP15, MP16 and MP17 is formed in each of N-type wells formed in a surface of the P-type semiconductor substrate 10 and separated from each other, respectively. MP11 and MP15 are assigned to be of P-channel type because the negative output electric potential LV generated by the negative electric potential generating charge pump circuit 112 is applied to the P-type semiconductor substrate 10. If they were to be formed of N-channel type, it would be necessary that the N-channel type MOS transistors were formed in P-type wells formed in N-type wells that were different from the N-type wells in which the P-channel type MOS transistors are formed, because each of the N-channel type MOS transistors would require a source electric potential isolated from the negative electric potential of the P-type semiconductor substrate 10.

Figure 12:
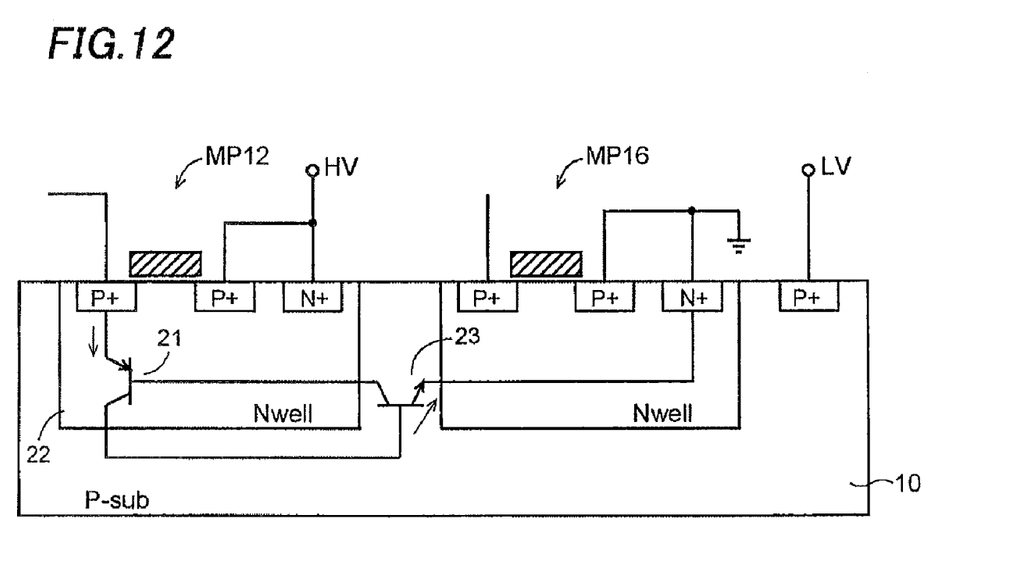
FIG. 12 is a partial cross-sectional view showing the charge pump circuit according to the third embodiment of this invention.

FIG. 12 is a partial cross-sectional view of the charge pump circuit. FIG. 12 shows cross-sectional views of the P-channel type charge transfer MOS transistors MP12 and MP16 shown in FIG. 11. When the positive electric potential generating charge pump circuit 111 is put into operation, a parasitic PNP bipolar transistor 21 is turned on and a substrate current flows from an N-type well 22 to the P-type semiconductor substrate 10. The substrate current raises the electric potential of the P-type semiconductor substrate 10 to turn on a parasitic NPN bipolar transistor 23. Then, a thyristor composed of the parasitic PNP bipolar transistor 21 and the parasitic NPN bipolar transistor 23 is turned on to reduce the positive output electric potential HV generated by the positive electric potential generating charge pump circuit 111. In the charge pump circuit according to the third embodiment, therefore, the parasitic NPN bipolar transistor 23 is prevented from turning on by putting the negative electric potential generating charge pump circuit 112 into operation to lower the electric potential of the P-type semiconductor substrate 10 to a below-VSS electric potential (−VDD) before the positive electric potential generating charge pump circuit 111 is put into operation.

Figure 13:
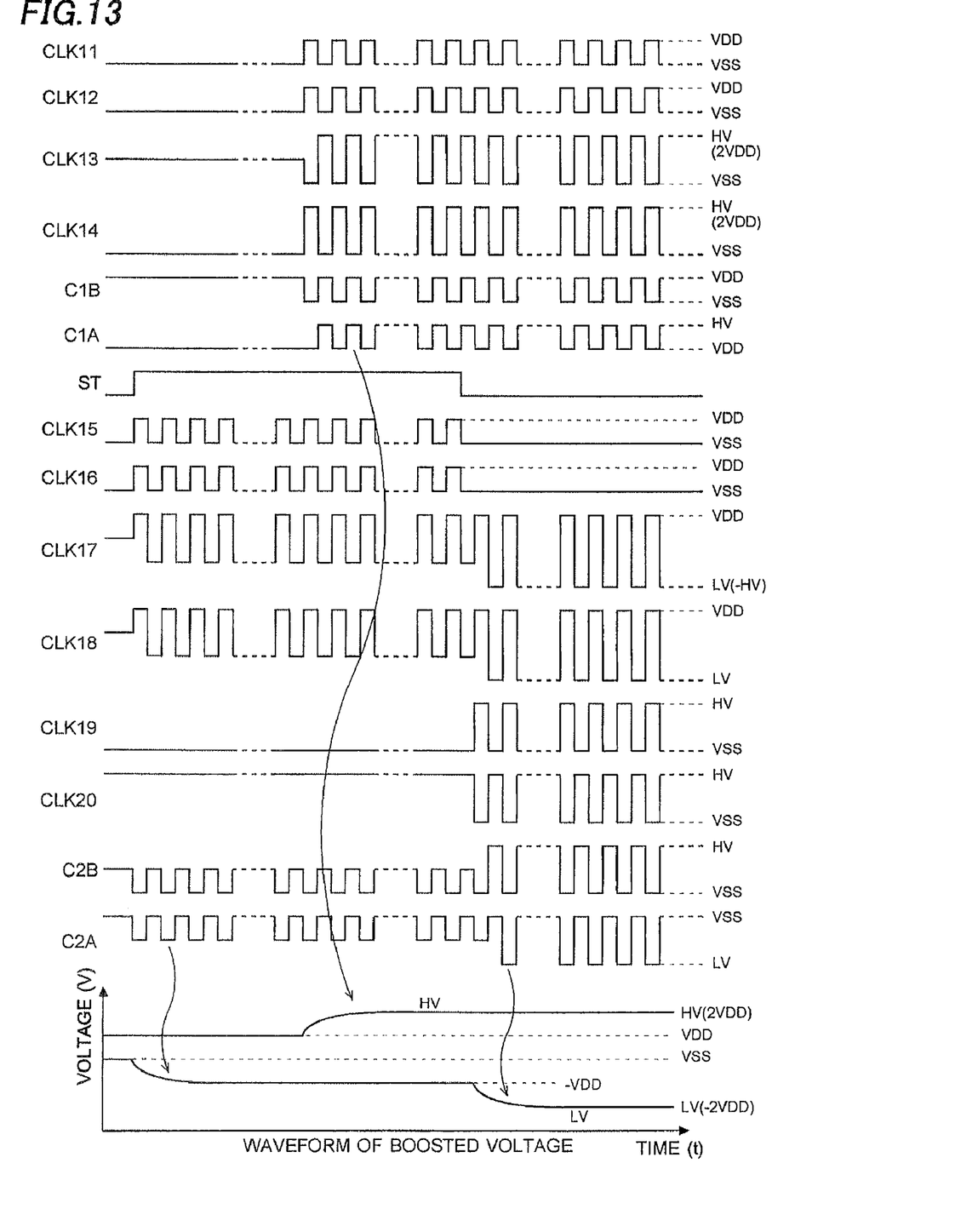
FIG. 13 is a waveform chart showing an operation of the charge pump circuit according to the third embodiment of this invention.

An operation of the charge pump circuit is hereafter explained referring to an operational waveform chart shown in FIG. 13. First, the negative electric potential generating charge pump circuit 112 is put into operation in the first operation mode described above to generate −VDD as the output electric potential LV. Since the output electric potential LV is applied to the P-type semiconductor substrate 10, the electric potential of the P-type semiconductor substrate 10 becomes −VDD.

After that, the positive electric potential generating charge pump circuit 111 is put into operation while the negative electric potential generating charge pump circuit 112 continues its operation. The positive electric potential generating charge pump circuit 111 performs the normal operation, because the electric potential of the P-type semiconductor substrate 10 is −VDD. After the output electric potential HV of the positive electric potential generating charge pump circuit 111 reaches 2VDD, the negative electric potential generating charge pump circuit 112 is put into the second operation mode (inverting HV) described above. As a result, the output electric potential LV of the negative electric potential generating charge pump circuit 112 becomes −HV (=−2VDD), and thus the electric potential of the P-type semiconductor substrate 10 becomes −HV.

Although the positive electric potential generating charge pump circuit 1 and the negative electric potential generating charge pump circuit 2 include two charge transfer MOS transistors respectively so that the positive electric potential generating charge pump circuit 1 performs double voltage boosting and the negative electric potential generating charge pump circuit 2 performs "multiplying by minus one" voltage boosting in the first and second embodiments, this invention is not limited to the above and the number of charge transfer MOS transistors may be increased to enhance the voltage boosting capability.

Also, although the positive electric potential charge pump circuit 111 includes two charge transfer MOS transistors in the third embodiment, this invention is not limited to the above and the number of charge transfer MOS transistors may be increased to enhance the voltage boosting capability.

According to the embodiments of this invention, in the charge pump circuit provided with the positive electric potential generating charge pump circuit that generates the positive electric potential and the negative electric potential generating charge pump circuit that generates the negative electric potential, the parasitic bipolar transistor is prevented from turning on so that the charge pump circuit can perform the normal voltage boosting operation.

What is claimed is:

1. A charge pump circuit comprising:
   a positive electric potential generating charge pump circuit that generates a positive electric potential;
   a negative electric potential generating charge pump circuit that generates a negative electric potential;
   a semiconductor substrate of a first general conductivity type to which the negative electric potential is applied;
   a control circuit that controls the negative electric potential generating charge pump circuit and the positive electric potential generating charge pump circuit;
   a well of a second general conductivity type formed in a first surface portion of the semiconductor substrate, the positive electric potential being applied to the well; and
   a diffusion layer of the second general conductivity type formed in a second surface portion of the semiconductor substrate,
   wherein the control circuit controls the positive and negative electric potential generating charge pump circuits so that the positive electric potential generating charge pump circuit starts generating the positive electric potential after the negative electric potential generating charge pump circuit starts generating the negative electric potential.

2. The charge pump circuit of claim 1, wherein the negative electric potential generating charge pump circuit is configured to generate the negative electric potential using the positive electric potential generated by the positive electric potential generating charge pump circuit.

3. The charge pump circuit of claim 2, wherein the negative electric potential generating charge pump circuit generates the negative electric potential by inverting the positive electric potential.

* * * * *